United States Patent
Omote et al.

(10) Patent No.: US 7,144,931 B2
(45) Date of Patent: Dec. 5, 2006

(54) METHOD OF MANUFACTURING POLYMER PARTICLES

(75) Inventors: Masaki Omote, Otake (JP); Akihiro Toritani, Hiroshima (JP); Daisuke Shiramizu, Saiki-gun (JP); Hiroyuki Iyota, Osaka (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 18 days.

(21) Appl. No.: 10/477,610

(22) PCT Filed: May 17, 2002

(86) PCT No.: PCT/JP02/04787

§ 371 (c)(1),
(2), (4) Date: Nov. 14, 2003

(87) PCT Pub. No.: WO02/092679

PCT Pub. Date: Nov. 21, 2002

(65) Prior Publication Data

US 2004/0152867 A1 Aug. 5, 2004

(30) Foreign Application Priority Data

May 17, 2001 (JP) .................................. 2001-148137

(51) Int. Cl.
*C08J 3/20* (2006.01)

(52) U.S. Cl. ...................... 523/342; 34/418; 34/424; 34/372; 526/329.7

(58) Field of Classification Search ............... 34/418, 34/424, 372; 526/329.7; 523/342
See application file for complete search history.

(56) References Cited

U.S. PATENT DOCUMENTS 4,767,803 A * 8/1988 Yasui et al. ............... 523/335
4,890,479 A * 1/1990 Glover et al. ............... 73/23.31
4,892,932 A * 1/1990 Rauch et al. ............... 528/499
5,231,125 A * 7/1993 Kitazawa et al. ........... 524/296
5,460,041 A * 10/1995 Andes et al. ............ 73/335.08
2002/0072566 A1 * 6/2002 Wills et al. ................... 525/50

FOREIGN PATENT DOCUMENTS

| EP | 0 299 344 | | 1/1989 |
| EP | 0 332 067 | | 9/1989 |
| JP | 63190601 | * | 8/1988 |
| JP | 1-275637 | | 11/1989 |
| JP | 04 145 131 | | 5/1992 |
| JP | 2000-080170 | * | 3/2000 |
| JP | 2001-329067 | | 11/2001 |
| JP | 2002-226595 | | 8/2002 |

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

A method of manufacturing polymer particles capable of increasing the easiness of handling of powder when the powder is collected and preventing the powder from adhering to the wall surface of a dryer and the outlet of the dryer from being clogged with the powder by suppressing the occurrence of ruptured particles to reduce the produced amount of the fine powder when polymer particles are produced by spraying and drying polymer latex, characterized in that, when the polymer latex having a minimum film forming temperature of 50° C. or higher is sprayed and dried with heating gas for drying in the dryer, the temperature of the heating gas for drying at the dryer outlet is less than the temperature obtained by adding 15° C. to the minimum film forming temperature of the polymer latex, the wet-bulb temperature thereof at the dryer outlet is higher than the temperature obtained by deducing 30° C. from the minimum film forming temperature of the polymer latex, and the heating gas for drying contains a vapor of 5 to 60 volume %.

4 Claims, 1 Drawing Sheet

METHOD OF MANUFACTURING POLYMER PARTICLES

TECHNICAL FIELD

The present invention relates to a method of manufacturing polymer particles by spraying and drying a polymer latex, and to a method of manufacturing polymer particles having excellent powder handability.

BACKGROUND ART

Generally, polymer particles can be manufactured from a polymer latex, for example, by adding a coagulating agent to the polymer latex, and spraying and drying the polymer latex in hot-air.

In the above-mentioned method of coagulating particles by adding the coagulating agent, many processes such as a coagulation process, a washing process for removing the coagulating agent, a dehydration process, and a drying process will be needed to collect the polymer particles. Accordingly, this method has problems of high facilities cost and complex operation control.

In the above-mentioned method of spraying and drying the polymer latex in hot air, the polymer particles are obtained by atomizing the polymer latex into a dryer. The polymer particles are obtained by evaporating water from whole surfaces of the atomized polymer latex, by forming film layers on their surfaces, and drying. Using this method, the polymer particles can be obtained from the polymer latex by a single process. This method is superior industrially, because it has low facilities cost and easy operation control.

However, if a polymer latex having a higher minimum film forming temperature is dried in hot air, some hard film layers formed on the surfaces of polymer latex particles will be broken. If these film layers are broken, the particles themselves will also be broken, and minute particles will be formed. Therefore, many minute particles tend to be contained in the polymer particles obtained by drying the polymer latex. These minute particles often cause dust, and it deteriorates powder handability of polymer particles.

Further, if a the dryer outlet temperature is raised to avoid the breaks of the polymer latex particles in the spraying and drying, the amount of adhered particles on the wall surface and the cone part of the dryer will be increased, and the polymer particles will clog at the outlet of the dryer.

JP-A No. 63-190601 describes a method of spraying and drying wherein a solution or slurry is dried using heated gas having more than 20% of partial pressure of superheated steam. By this method, when a solution or slurry containing inorganic compounds is used, concentrations of components exist in a particle can be equalized and heat efficiency can be raised. However, this document has no description about a polymer latex, a method of preventing from forming minute particles, and a method of decreasing the adhering and the clogging in the dryer.

DISCLOSURE OF THE INVENTION

The present invention is provided to solve the above issues when the polymer particles are manufactured by spraying and drying a polymer latex, and an aim of the present invention is to improve the powder handability of the polymer particles in a collecting and packing process by preventing the breakage of the polymer latex particles in drying and by reducing the amount of the minute particles, and to prevent the clogging with the polymer particles at the outlet and an inner wall of the dryer.

The inventors have researched the method of preventing the breakage of the polymer latex particles in the spraying and drying process. The inventors have found that a heated gas for drying used for the process having the specific amount of steam and a limited outlet temperature of the dryer can set forward self-bonding of the particles and prevent the breakage of the particles.

One embodiment of the present invention provides is a method of manufacturing polymer particles which is characterized in that, when a polymer latex having a minimum film forming temperature ($T$/° C.) of 50° C. or higher is sprayed and dried with heated gas for drying in a dryer, a temperature of the heated gas for drying at a outlet of the dryer ($T_0$/° C.) is shown by a formula of:

$$T_0 < T+15;$$

a wet-bulb temperature of the heated gas for drying at a outlet of the dryer ($T_w$/° C.) is shown by a formula of:

$$T_w > T-30;$$

and a content of steam in the heated gas for drying is from 5 to 60% by volume.

Further, in the present invention about a method of manufacturing polymer particles, it is preferable that a polymer which is contained in the polymer latex comprises 35% by weight or more of methyl methacrylate monomer unit.

BEST MODE FOR CARRYING OUT THE INVENTION

Figure 1:
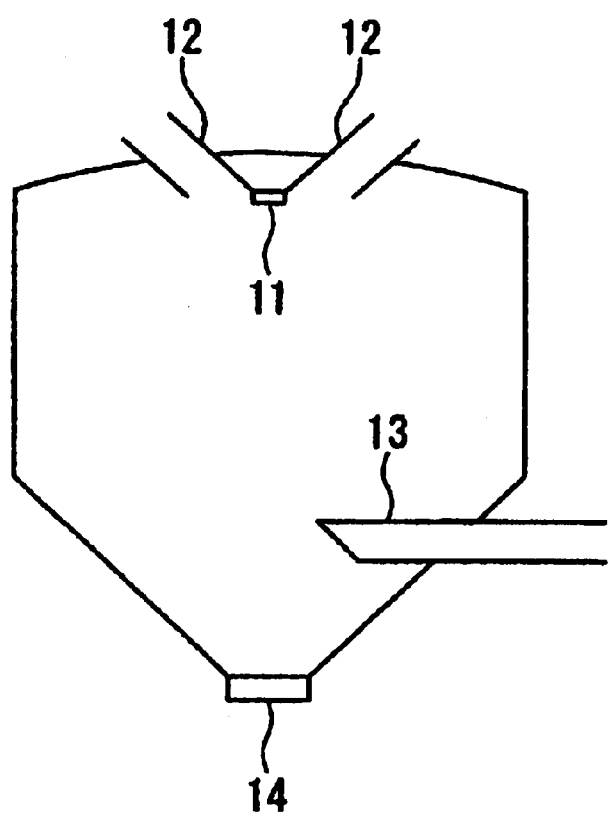
FIG. 1 illustrates a cross section of a dryer used in the present invention about a method of manufacturing polymer particles. In this FIGURE, the reference sign 11 shows an apparatus for atomizing, the reference sign 12 shows an inlet of the dryer, the reference sign 13 shows an outlet of the dryer, and the reference sign 14 shows an outlet for particles.

Preferable examples of the present invention about a method of manufacturing polymer particles are explained with referring to the FIGURE. However, the present invention is not limited to the examples, for example, each element of examples may be combined properly to form another example.

A preferred polymer latex used in the present invention is a material comprising an emulsified polymer which is dispersed in aqueous medium and it is not limited to use if the minimum film forming temperature of it is 50° C. or higher. The minimum film forming temperature of the latex is the minimum temperature for enabling to form a transparent and continuous film from a polymer latex. The minimum film forming temperature depends on a glass transition temperature of surfaces of the dispersed polymer particles in the latex very much. The minimum film forming temperature is nearly equal to a glass transition temperature of the polymer if composition in the each particle is uniform.

To measure the minimum film forming temperature, first, an aluminum plate connected with heaters or coolers on both edges of it is set to a level and a temperature gradient is made on the plate. Second, the latex is put on the plate uniformly and thinly and dried. Finally, the minimum temperature to form a transparent and continuous film is measured and it is regarded as the minimum film forming temperature.

An example of the polymer latex is a polymer emulsion obtained by copolymerization of one or more kinds of emulsified monomers such as aromatic vinyl monomers, vinyl cyanide monomers, ethylenic unsaturated carboxylic acid, vinyl halide monomers, and maleimide monomers. A seed polymerization method and a graft polymerization method are also available to obtain the polymer latex. And the polymer latex may be a latex of graft copolymer such as acrylonitrile-butadiene-styrene copolymer and methyl methacrylate-butadiene-styrene copolymer. One or more kinds of unsaturated nitrile monomers, (meth)acrylate monomers, aromatic vinyl monomers, and other monomers copolymerizable with the above-mentioned monomers are copolymerized with rubber copolymers such as diene copolymers and acrylic rubber polymers to obtain these copolymer.

Among them, a polymer which comprises 35% by weight or more of methyl methacrylate monomer unit is preferred as it reduces the breakage of the polymer latex particles in drying and the amount of the minute particles, and improves the effects to prevent the clogging with the polymer particles at the outlet and the adhering on the inner wall of the dryer. Examples of the methacrylate monomers include methyl methacrylate, butyl methacrylate, etc.

When the above-mentioned polymer is a copolymer comprising methacrylate monomers and acrylate monomers, the above-mentioned effects are more improved.

The polymerization method of the polymer latex is not limited, and it may be polymerized by an emulsion polymerization method known in public. Though an initiator used in the polymerization is not limited, examples of the initiators which may be used include redox initiators comprising water-soluble peroxodisulfates such as potassium peroxodisulfate, sodium peroxodisulfate, and ammonium peroxodisulfate, and organic peroxide such as diisopropylbenzenehydroperoxide, p-menthanehydroperoxide, cu-menehydroperoxide, and t-butylhydroperoxide.

And though an emulsifier used in the polymerization is not limited, one or more kinds of examples of the emulsifiers including alkali metal salts of higher fatty acid such as disproportionated rosin acid, oleic acid, and stearic acid; and alkali metal salts of sulfonic acid such as dodecylbenzenesulfonic acid can be used.

Optionally, a crosslinking agent such as divinylbenzene, 1,3-butylene dimethacrylate, allyl methacrylate, and glycidyl methacrylate, and a chain transfer agent such as mercaptans and terpenes can be used in the polymerization.

An antioxidant or an additive to prevent oxidation in the dryer can be added to the obtained polymer latex.

And an inorganic filler such as silica, talc, and calcium carbonate, poly(acrylate), poly(vinyl alcohol), and poly(acrylamide) can be added to improve powder properties of the finally obtained polymer particles such as anti-blocking and bulk density.

The obtained polymer latex is sprayed and dried in a dryer by heated gas for drying. In the spraying and drying (spray-drying) one kind of polymer latex can be used, and a mixture of two kinds or more of polymer latexes synthesized separately can also be used.

The (spray-)dryer used in the spraying and drying is not limited if the dryer is like a dryer shown in the FIG. 1 having at least an apparatus for atomizing 11 which sprays the polymer latex into the dryer, an inlet of the dryer 12 for inducing the heated gas for drying to dry the sprayed polymer latex, and an outlet of the dryer 13 for discharging the heated gas for drying and the dried powder.

However, it is preferable to place the apparatus for atomizing 11 on the upper of the dryer. And it is preferable to place the inlet of the dryer 12 on the upper of the dryer to contact the heated gas for drying with the sprayed latex directly. And it is preferable to place the outlet of the dryer 13 on the lower of the dryer to form a down stream of the heated gas for drying from the top to the bottom of the dryer.

The dryer is not limited by a whole shape of it. Further, it is not limited by volume, and all of the volumes of from a small scale for laboratory to a large scale for industrial use are available.

The heated gas for drying is a gas which contains from 5 to 60% by volume of steam. Even the inside of the polymer latex can be heated and dried instantly by using the heated gas for drying containing steam because steam has high specific heat and high condensation heat. If the content of steam is less than 5% by volume, the breakage of the particles cannot be reduced sufficiently. If the content of steam is more than 60% by volume, the steam may be condensed in the dryer.

The gas mixed with steam is not limited, for example, air, nitrogen, and carbon dioxide can be used as the gas.

The vapor pressure of steam in the heated gas for drying at the outlet of the dryer 13 must be lower than the saturated vapor pressure at the temperature of the outlet of the dryer. If the vapor pressure of the heated gas at the temperature of the outlet of the dryer is higher than the saturated vapor pressure at the temperature of it, the vapor is condensed.

One part or all of waste gas separated in the process of collecting the polymer particles can be used as the heated gas for drying by reheating and circulating. In the reheating and circulating, it is preferable to control a humidity of the gas by an operation such as condensation.

A temperature of the heated gas for drying at the outlet of the dryer 13 is lower than the temperature obtained by adding 15° C. to the minimum film forming temperature of the polymer latex. That is, when the temperature of the heated gas for drying at the outlet of the dryer 13 is $T_0$, and when the minimum film forming temperature of the polymer latex is T, a formula of $T_0 < T+15$ is shown.

If the temperature of the heated gas for drying at the outlet of the dryer 13 is not lower than the temperature obtained by adding 15° C. to the minimum film forming temperature of the polymer latex, adhering of the polymer latex particles to the wall surface and clogging with the polymer particles at the outlet of the dryer 13 will occur. Though a lower limit temperature of the heated gas for drying at the outlet of the dryer 13 is not limited, it is preferable to be 50° C. or more of the temperature. If the lower limit temperature of the heated gas for drying at the outlet of the dryer 13 is not more than 50° C., the polymer particles may not be dried sufficiently.

Furthermore, to make the temperature of the heated gas at the outlet of the dryer 13 lower than the temperature obtained by adding 15° C. to the minimum film forming temperature of the polymer latex, it is preferable, for example, to control the temperature of the heated gas for drying by controlling output of a heater or flux of the heated gas for drying at the inlet of the dryer 12. And it is preferable, for example, to control the temperature of the heated gas for drying by controlling an amount of the polymer latex for spraying from the apparatus for atomizing 11.

A wet-bulb temperature of the heated gas for drying at the outlet of the dryer 13 is higher than a temperature obtained by subtracting 30° C. from the minimum film forming temperature of the polymer latex. That is, when the wet-bulb temperature of the heated gas for drying at the outlet of the dryer 13 is $T_w$, and when the minimum film forming temperature of the polymer latex is T, a formula of $T_w$>T−30 is shown. If the wet-bulb temperature of the heated gas for drying at the outlet of the dryer 13 is not higher than the temperature obtained by subtracting 30° C. from the minimum film forming temperature of the polymer latex, film layers formed on the surfaces of polymer latex particles are broken, broken particles are formed, and minute particles are increased. Though the upper limit of the wet-bulb temperature of the heated gas for drying is not limited, it is preferable to be lower than 80° C. If the upper limit of the wet-bulb temperature of the heated gas for drying is not lower than 80° C., adhering of the polymer particles to the cone part or clogging with the polymer particles at the outlet of the dryer may occur.

The wet-bulb temperature is a temperature obtained by reaching to a dynamic equilibrium of a droplet when a microdroplet is set in a sufficient amount of unsaturated gas and these are insulated from the outside. In a state of reaching the dynamic equilibrium, the amount of heat transfer of gas and water is equal to the amount of heat absorbed by evaporation of water.

If a temperature of the unsaturated gas is t[° C.], a wet-bulb temperature is $t_w$[° C.], a humidity of the gas at t[° C.] is H[kg-$H_2$O/kg-dried air], a saturated humidity at $t_w$[° C.] is $H_w$[kg-$H_2$O/kg-dried air], a latent heat by evaporation of water at $t_w$ is $\gamma_w$[kcal/kg], a heat transfer coefficient in a gas boundary layer is h[kcal/$m^2$·hr·K], and a material transfer coefficient is k[kg/$m^2$·hr·ΔH], the wet-bulb temperature can be shown by a below-mentioned formula (2).

$$H_w - H = (h/\gamma_w \cdot k)(t - t_w) \qquad (2)$$

And the wet-bulb temperature $t_w$[° C.] can also be determined by applying the humidity H at the temperature of the unsaturated gas t[° C.] to a known humidity chart.

The determined wet-bulb temperature shows the temperature of the surface of the particles.

As the apparatus for atomizing which places on the dryer, a known apparatus for atomizing for spraying and drying such as a rotary atomizer, a two-fluid nozzle, a pressure nozzle, and air-assisted pressure nozzle can be used.

The factor to determine the structure of the polymer particles is the adhesion force of the surfaces of the polymer particles in the polymer latex, and the adhesion force of the surfaces of the particles is determined by a relationship between the wet-bulb temperature which shows the temperature of the surfaces of the particles and the minimum film forming temperature which shows the glass transition temperature of the surfaces of the particles. Not only in a polymer latex containing polymers having a homogeneous composition but in a polymer latex having a multi-layered structure can be related with the adhesion force of the surfaces of the particles by the minimum film forming temperature.

The structure of the particles becomes good if the temperature of the surfaces of the particles and the glass transition temperature of it have a proper relation like the present invention.

That is, in the present invention concerning a method of manufacturing polymer particles, the temperature of the heated gas for drying at the outlet of the dryer 13 is lower than the temperature obtained by adding 15° C. to the minimum film forming temperature of the polymer latex, and the wet-bulb temperature of it at the outlet of the dryer 13 is higher than the temperature obtained by subtracting 30° C. from the minimum film forming temperature of the polymer latex, and the heated gas for drying contains from 5 to 60% by volume of steam. By these conditions, the self-bonding of the particles is set forward and the film layers formed on the surfaces become thicker and harder to break, and the breaks of polymer latex particles in drying are prevented and the formation of the broken particles is decreased. With the result, the amount of the minute particles is reduced, and the powder handability of the polymer particles in the collecting and packing process is improved, and the adhering of the polymer particles to the inner wall of the dryer and the clogging with the polymer particles at the outlet of the dryer can be prevented.

The polymer particles having excellent qualities of powder can be used preferably for processing aids like lubricant or impact modifiers for plastics such as vinyl chloride resin, polystyrene, polycarbonate, ABS resin, acrylic resin, acrylonitrile-styrene copolymer(AS) resin, and engineering plastics.

EXAMPLES

Hereinafter, the present invention is explained more specifically by the following non-limiting examples. In the following, "parts" in examples and comparative examples refer to "parts by weight" unless otherwise specified.

Example 1

(1) Synthesis of a Polymer Latex

Into a reactor equipped with a stirrer was charged 68 parts of methyl methacrylate, 29 parts of butyl methacrylate, 3 parts of butyl acrylate, 0.005 parts of tert-dodecyl mercaptan, 1.0 parts of potassium alkenyl succinate, and 220 parts of deionized water, and heated up while stirring after displacement(purging oxygen from a reactor) by nitrogen. When a temperature inside the reactor was reached to 45° C., into the reactor was charged a mixture of 0.15 parts of potassium peroxodisulfate and 10 parts of deionized water to start polymerization and the temperature of 45° C. was kept for 90 minutes. And obtained polymer latex (solid content 30.2%) was taken out of the reactor.

(2) Measurement of the Minimum Film Forming Temperature

The minimum film forming temperature of the above-mentioned latex was measured by using an apparatus for minimum film forming temperature (manufactured by Takabayashirika Co., Ltd.). A thermo-controller on one edge of an aluminum plate was set at 20° C. and a thermo-controller on the other edge of it was set at 180° C. On the aluminum plate having a temperature gradient, the polymer latex was put on the plate uniformly and thinly and dried. And the measured minimum temperature to form a transparent and continuous film regarded as the minimum film forming temperature was 69° C.

(3) Spraying and Drying

After air whose temperature was 25° C. and relative humidity was 60% was heated by a heater, the air and steam were blended to make the amount of steam become 10% by volume. The temperature of mixed gas containing the air and the steam at the inlet of the dryer was controlled at 168° C. and it was used for the heated gas for drying. And after inside of the dryer was heated by the heated gas for drying, the above-mentioned polymer latex was introduced from the apparatus for atomizing and it was sprayed and dried in a condition to make the temperature at the outlet of the dryer become 75° C.

Concerning about the shape of the dryer, a bore of a cylinder part was 3.5 m, a height of the cylinder part was 4 m, and a part of the cone part was 2.8 m. And as the apparatus for atomizing, a rotary disk which rotates 15000 rpm.

Feeding speed of the latex in spraying and drying, amount of heated gas for drying, temperature at the inlet of the dryer, temperature at the outlet of the dryer, wet-bulb temperature at the outlet of the dryer, dew point at the outlet of the dryer, and absolute humidity at the outlet of the dryer were shown in Table 1.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Minimum film forming temperature | [° C.] | 69 | 65 | 61 | 70 | 69 | 69 | 69 |
| Amount of the latex | [kg/hr] | 116 | 130 | 130 | 130 | 116 | 116 | 116 |
| Temperature at the inlet of the dryer | [° C.] | 168 | 172 | 172 | 172 | 152 | 193 | 190 |
| Temperature at the outlet of the dryer | [° C.] | 75 | 75 | 75 | 75 | 75 | 90 | 85 |
| Dew point | [° C.] | 51 | 68 | 68 | 68 | 16 | 37 | 16 |
| Absolute humidity at the outlet of the dryer | [kg/kg-air] | 0.093 | 0.275 | 0.275 | 0.275 | 0.012 | 0.045 | 0.012 |
| Wet-bulb temperature at the outlet of the dryer | [° C.] | 54 | 70 | 69 | 70 | 37.5 | 45 | 38 |
| Amount of steam | Vol % | 10 | 29.8 | 29.8 | 29.8 | 0 | 5.2 | 0 |
| Amount of air | Vol % | 90 | 70.2 | 70.2 | 70.2 | 100 | 94.8 | 100 |
| Flux of the gas | [m³/min] | 32 | 43 | 43 | 43 | 30 | 32 | 30 |
| Broken particles | — | A | A | A | A | C | B | C |
| Adhesion to the cone part | — | B | B | B | B | B | C | C |

(4) Evaluations of Physical Properties

[Status of Forming Broken Particles]

The obtained polymer particles were observed by an optical microscope, and a degree of forming broken particles was confirmed by watching and it was evaluated by below-mentioned three levels. The results are shown in Table 1.
A . . . No broken particles
B . . . Only a few forming of broken particles
C . . . Many forming of broken particles

[Adhesion to the Cone Part]

After the spraying and drying, the inside of the dryer was observed by watching and evaluated by below-mentioned three levels The results are shown in Table 1.
A . . . There was no adhesion to the cone part.
B . . . Though some adhesion was observed, there was no problem for a continuous operation.
C . . . Clogging was occurred by heavy adhesion to the cone part Comparative Example 1

Same polymer latex used in the example 1 was used, only air was used as the heated gas in the spraying and drying, and the same method applied in the example 1 was operated except the temperature at the inlet of the dryer was changed to 152° C. for setting the temperature at outlet of the dryer to 75° C.

The result is shown in the Table 1. Though there was no problem for the adhesion to the cone part, many broken particles were confirmed and rising dust from the powder was very heavy.

Comparative Example 2

Same polymer latex used in the example 1 was used, and the same method applied in the example 1 was operated except the temperature at the inlet of the dryer was changed to 192° C. for setting the amount of steam in spraying and drying to 5.2% by volume and setting the temperature at outlet of the dryer to 90° C.

The result is shown in the Table 1. Though there were few forming of broken particles, it was confirmed that adhesion to the cone part was heavy and clogging was nearly occurred.

Comparative Example 3

Same polymer latex used in the example 1 was used, only air was used as the heated gas in the spraying and drying, and the same method applied in the example 1 was operated except the temperature at the inlet of the dryer was changed to 190° C. for setting the temperature at outlet of the dryer to 85° C.

The result is shown in the Table 1. Many broken particles and heavy adhesion to the cone part were confirmed.

Example 2

(1) Synthesis of Polymer Latex

Into a reactor equipped with a stirrer was charged 0.03 parts of n-octyl mercaptan, 1 parts of potassium alkenyl succinate, 80 parts of methyl methacrylate, 20 parts of butyl acrylate, and 260 parts of water, and heated up while stirring after displacement (purging oxygen from a reactor) by nitrogen. When a temperature inside the reactor was reached to 45° C., into the reactor was charged a mixture of 2.0 parts of potassium peroxodisulfate and 10 parts of deionized water to start polymerization and the temperature of 69° C. was kept for 120 minutes. And obtained polymer latex (solid content 26.9%) was taken out of the reactor.

(2) Measurement of Minimum Film Forming Temperature

The minimum film forming temperature of the above-mentioned latex was measured by the method used in the example 1 and it was 65° C.

(3) Spraying and Drying

The same method used in the example 1 was applied. The feeding speed of the latex, the amount of heated gas, the temperature at the inlet of the dryer, and the temperature at the outlet of the dryer were shown in the Table 1.

(4) Evaluations of Physical Properties

The same method used in the example 1 was applied. The results were shown in the Table 1.

Example 3

(1) Synthesis of Polymer Latex

Into a reactor equipped with a stirrer was charged 0.15 parts of potassium peroxodisulfate, 0.002 parts of n-octyl mercaptan, 1 parts of potassium alkenyl succinate, 40 parts of methyl methacrylate, 2 parts of butyl acrylate, and 260 parts of water, and polymerized at 68° C. and 1 hour. After that, 44 parts of methyl methacrylate, and 14 parts of butyl acrylate were added and polymerized at 60° C. for 4 hours. And obtained polymer latex (solid content 27.9%) was taken out of the reactor.

(2) Measurement of Minimum Film Forming Temperature

The minimum film forming temperature of the above-mentioned latex was measured by the method used in the example 1 and it was 61° C.

(3) Spraying and Drying

The same method used in the example 1 was applied. The feeding speed of the latex, the amount of heated gas, the temperature at the inlet of the dryer, and the temperature at the outlet of the dryer were shown in the Table 1.

(4) Evaluations of Physical Properties

The same method used in the example 1 was applied. The results were shown in the Table 1.

Example 4

(1) Synthesis of Polymer Latex

Into a reactor equipped with a stirrer was charged 0.15 parts of potassium peroxodisulfate, 0.03 parts of n-octyl mercaptan, 1 parts of potassium alkenyl succinate, 80 parts of methyl methacrylate, 20 parts of ethyl acrylate, and 260 parts of water, and polymerized at 69° C. and 2 hour. After that, 44 parts of methyl methacrylate, and 14 parts of butyl acrylate were added and polymerized at 60° C. for 4 hours. And obtained polymer latex (solid content 26.4%) was taken out of the reactor.

(2) Measurement of Minimum Film Forming Temperature

The minimum film forming temperature of the above-mentioned latex was measured by the method used in the example 1 and it was 70° C.

(3) Spraying and Drying

The same method used in the example 1 was applied. The feeding speed of the latex, the amount of heated gas, the temperature at the inlet of the dryer, and the temperature at the outlet of the dryer were shown in the Table 1.

(4) Evaluations of Physical Properties

The same method used in the example 1 was applied. The results were shown in the Table 1.

[Results]

In example 1, example 2, example 3, and example 4, because the temperature of the heated gas for drying at the outlet of the dryer were lower than the temperature obtained by adding 15° C. to the minimum film forming temperature of the polymer latex, the wet-bulb temperature of it at the outlet of the dryer were higher than the temperature obtained by subtracting 30° C. from the minimum film forming temperature of the polymer latex, and it contained from 5 to 60% by volume of steam, the polymer particles having small amount of the adhesion at the cone part and small amount of the broken particles were obtained.

On the other hand, in example 1 and 3, because the wet-bulb temperature of the heated gas for drying at the outlet of the dryer were lower than the temperature obtained by subtracting 30° C. from the minimum film forming temperature of the polymer latex, there were many broken particles. And in example 2 and 3, because the temperature of the heated gas for drying at the outlet of the dryer were higher than the temperature obtained by adding 15° C. to the minimum film forming temperature of the polymer latex, adhesion to the cone part was heavy and the collecting polymer particle was difficult.

The present invention prevents the breakage of the polymer latex particles in drying, it reduces the amount of the minute particles, it improves the powder handability, and it prevents the adhesion of the polymer particle at the inner wall of the dryer and the clogging with the polymer particles at the outlet of the dryer.

INDUSTRIAL APPLICABILITY

The present invention relates to a method of manufacturing polymer particles by spraying and drying polymer latex, and relates to a method of manufacturing polymer particles having excellent powder handability. Furthermore, it relates to a method of manufacturing to reduce the amount of the broken particles in the dryer when the polymer latex powder is dried.

This application is based on Japanese application JP 2001-148137, filed May 17, 2001, the entire contents of which are hereby incorporated by reference.

What is claimed is:

1. A method of manufacturing polymer particles, comprising spray-drying at least one polymer latex having a minimum film forming temperature (T/° C.) of 50° C. or higher with heated gas in a spray-dryer that has a gas inlet and a gas outlet, wherein:

the temperature of the heated gas for drying the polymer latex at said outlet of the dryer ($T_0$/° C.) is within the limits of the formula:

$$T_0 < T + 15;$$

the wet-bulb temperature ($T_w$/° C.) of the heated gas for drying the polymer latex at said outlet of the dryer is within the limits of the formula:

$$T_w > T - 30; \text{ and}$$

the content of steam in the heated gas ranges from 5 to 60% by volume.

2. The method according to claim 1, wherein said polymer latex comprises a polymer having 35% by weight or more of one or more of methyl methacrylate monomer units or butyl methacrylate monomer units.

3. The method according to claim 2, wherein said polymer latex comprises a polymer having 35% by weight or more of one or more of methyl methacrylate monomer units.

4. The method according to claim 1 wherein the moisture containing gas is air, nitrogen or carbon dioxide.

* * * * *